United States Patent
Wasser

Patent Number: 5,468,002
Date of Patent: Nov. 21, 1995

[54] MECHANICAL END FACE SEAL HAVING AN IMPROVED MATING RING

[75] Inventor: James R. Wasser, Gurnee, Ill.

[73] Assignee: John Crane Inc., Morton Grove, Ill.

[21] Appl. No.: 142,175

[22] Filed: Oct. 25, 1993

[51] Int. Cl.⁶ .................................................. F16J 15/34
[52] U.S. Cl. ............................ 277/65; 277/67; 277/93 R
[58] Field of Search ............................ 277/19, 20, 22, 277/59, 65, 68, 81 R, 93 R, 93 SD, 96.1, 133, 67; 415/180

[56] References Cited

U.S. PATENT DOCUMENTS

| | | | |
|---|---|---|---|
| 2,432,684 | 12/1947 | Roshong | 277/93 R |
| 3,484,113 | 12/1969 | Moore | 277/93 R |
| 3,746,349 | 7/1973 | Smale et al. | 277/68 X |
| 3,895,811 | 7/1975 | Richard, Jr. et al. | 277/22 |
| 4,099,728 | 7/1978 | Wiese | 277/93 SD X |
| 4,099,729 | 7/1978 | Nylykke | 277/96.1 |
| 4,114,899 | 9/1978 | Külzer et al. | 277/93 SD X |
| 4,415,165 | 11/1983 | Martini | 277/65 X |
| 5,217,234 | 6/1993 | Hornsby | 277/65 X |
| 5,238,253 | 8/1993 | Sieghartner | 277/93 SD X |
| 5,249,812 | 10/1993 | Volden et al. | 277/22 X |

FOREIGN PATENT DOCUMENTS

| | | | |
|---|---|---|---|
| 1415233 | 12/1965 | France | 277/22 |
| 2234788 | 2/1991 | United Kingdom | 277/65 |

Primary Examiner—William A. Cuchlinski, Jr.
Assistant Examiner—John L. Beres
Attorney, Agent, or Firm—Dorn, McEachran, Jambor & Keating

[57] ABSTRACT

A mechanical end face seal with a mating ring having a beveled inner diameter extending frusto-conically to the back face. Atmosphere or other fluids located outside of the housing can enter through the frusto-conical opening between the primary ring and the shaft to cool the seal rings during shaft rotation. In a preferred embodiment, a drive collar disposed adjacent the primary ring and attached to the shaft includes a series of cantilever projection portions which rotate in the atmosphere outside the housing to circulate the atmosphere into the frusto-conical space between the beveled inner diameter of the stationary mating ring to provide a fan blade effect.

15 Claims, 2 Drawing Sheets

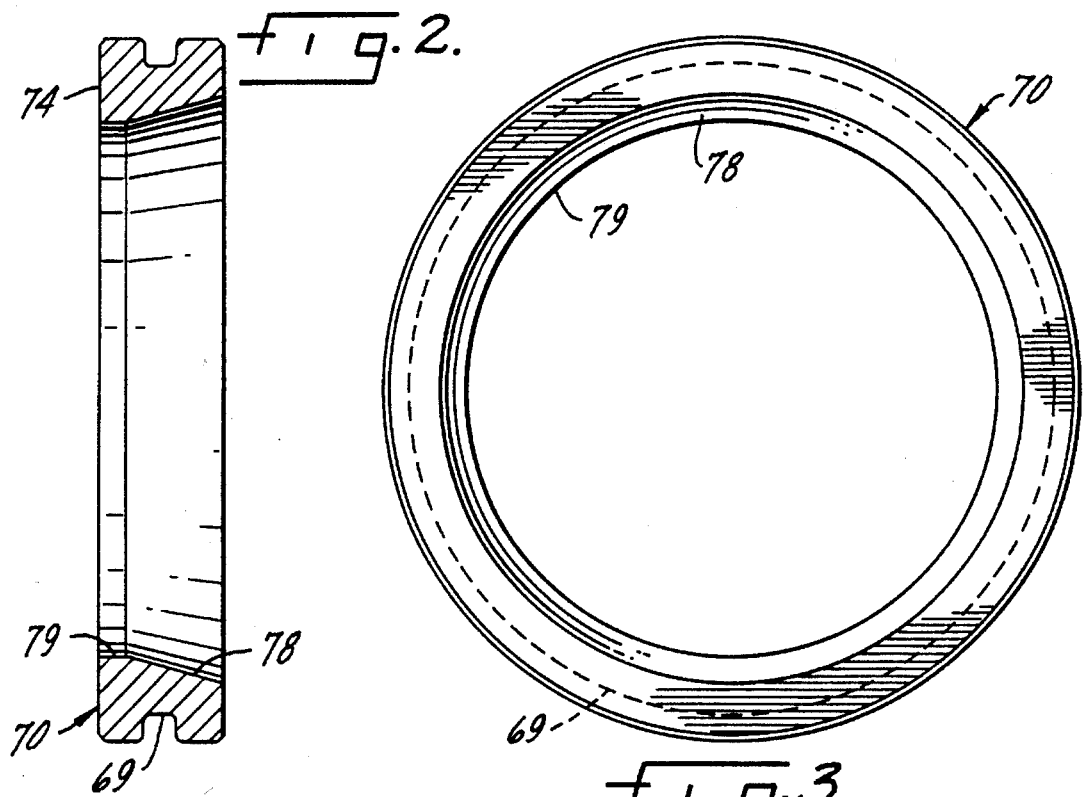
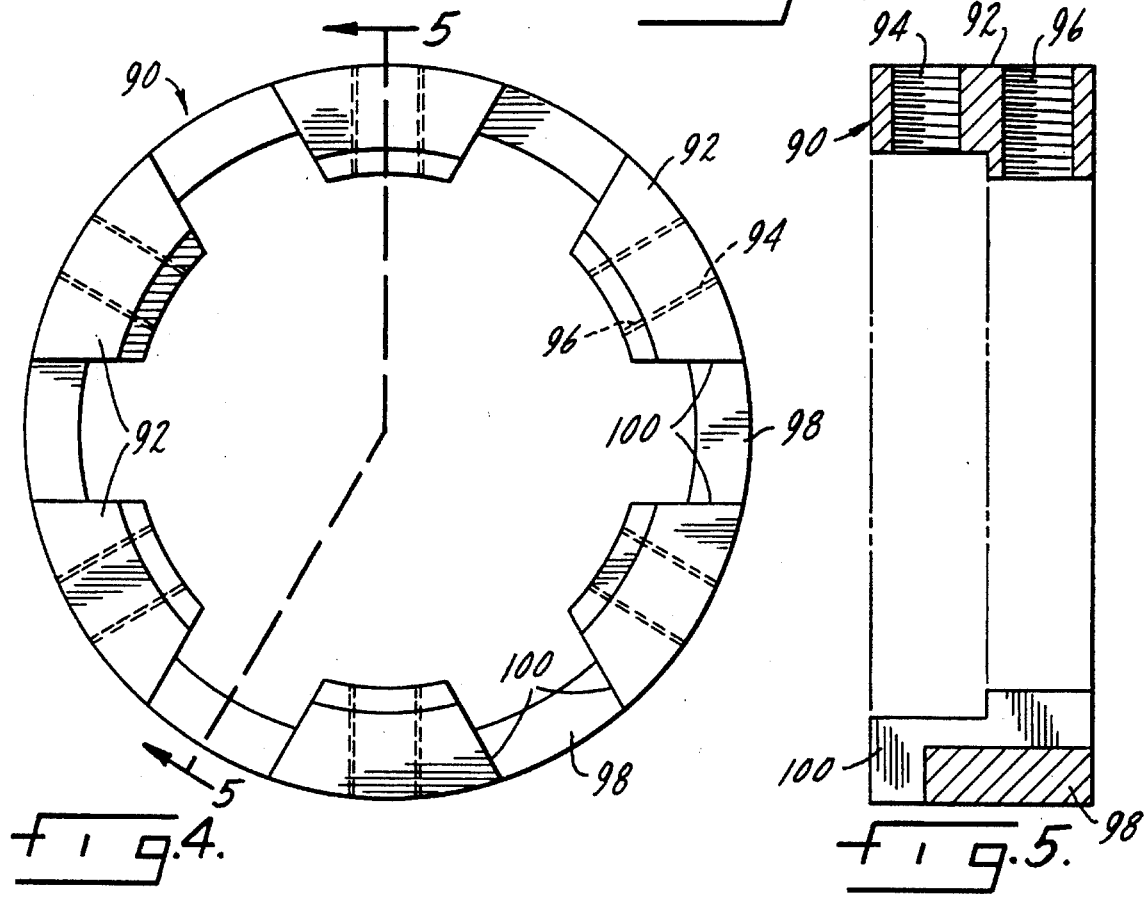

MECHANICAL END FACE SEAL HAVING AN IMPROVED MATING RING

BACKGROUND OF THE INVENTION

1. Field of the Invention

This invention relates generally to mechanical end face seals and more particularly to end face seals of the contacting type which provide for cooling the seal rings to remove the heat that is caused by rotational friction.

2. Background Art

Non-contacting mechanical face seals of the gap type create a fluid gap between the seal faces at the interface so that the fluid between the faces acts as a lubricant. Thus, non-contacting seals do not create a tremendous amount of heat at the interface because of the reduced friction between the relatively rotating rings. Moreover, a small amount of fluid which escapes between the sealing faces tends to cool the rings by absorbing and removing any heat which does develop.

Contacting seals have increased rotational friction relative to non-contacting seals because contacting seals develop frictional heat at the interface between the relatively rotating sealing faces. Thus, contacting seal design must take into account the heat generated by the friction of the relatively rotating seal faces at the interface. Normally, heat removal from the seal interface area of a contacting seal is achieved by conductive cooling through dissipation of the heat into the seal ring mass and distribution of the heat to an area removed from the seal interface. The heat is then dissipated into the environment from the ring portions located away from the seal interface. The amount of heat which these devices can effectively dissipate into the environment is necessarily limited by the temperature and convective properties of the material which is around the seal interface.

Attempts to cool the rings of a dual mechanical face seal arrangement have included circulating a buffer fluid through the buffer chamber by means of an internal circulation means. Examples of this type of device are disclosed in U.S. Pat. No. 4,721,311, issued to Kakabaker and U.S. Pat. No. 5,217,234 issued to Hornsby. The buffer fluid in both these devices is circulated through the buffer chamber in order to cool at least one of the sealing rings ill each of the two seals which define the dual seal apparatus.

It has been found that use of the present invention provides additional cooling to the rings of a seal and can significantly reduce the temperature of at least the outboard seal of a dual mechanical face seal arrangement. Reducing the temperature of a seal provides for a more effective seal due to reduction in the seal rings of mechanical stress and of thermal taper and a corresponding reduction in leakage from between the faces of a contacting seal.

BRIEF DESCRIPTION OF THE DRAWINGS

FIG. 2 is a detailed cross-sectional view of one sealing ring of the seal according to the present invention.

FIG. 3 is a side view of the sealing ring shown in FIG. 2.

FIG. 4 is a detailed elevational view of the drive collar of a seal according to the invention.

FIG. 5 is a cross-sectional view of the drive collar taken approximately along the line 5—5 of FIG. 4 (background omitted for clarity).

DETAILED DESCRIPTION OF THE PREFERRED EMBODIMENT

Figure 1:
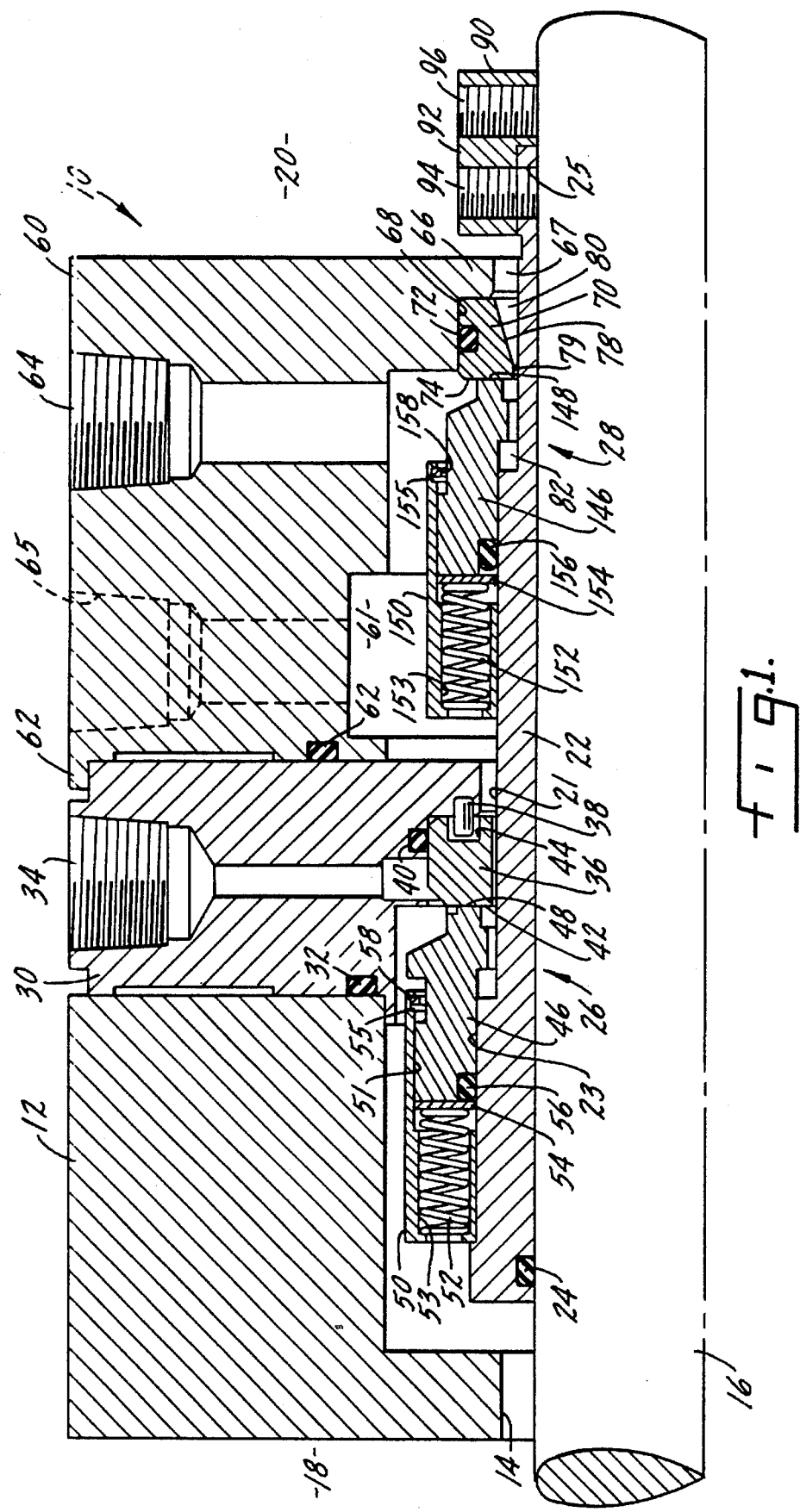
FIG. 1 is a cross-sectional view of a seal according to the present invention.

FIG. 1 illustrates in a cross-sectional view of a double seal system for sealing between a housing 12 having an aperture 14 and a relatively rotating shaft 16 extending through the aperture 14. The housing 12 seals a process fluid which is contained in the space 18 enclosed by the housing 12. Some process fluids may be toxic and environmentally unsafe so that leakage into the environment outside the sealed area or to atmosphere, generally designated at 20, is to be avoided.

The seal system 10 consists of a shaft sleeve 22 which is sealed to the shaft by means of an O-ring 24. The shaft sleeve may comprise a stepped cylindrical tube which can be slipped over the shaft 16 and may comprise annular sleeve steps 21,23, where step 23 has a step of greater diameter than step 21. An aperture 25 is available at the atmosphere side of the sleeve 22 for attaching the shaft sleeve 22 over the shaft 16 to inhibit relative displacement in either the rotational or axial directions.

Each annular step 21,23 of the shaft sleeve is capable of slidingly accepting at least one seal module, comprising an inboard seal module 26 and an outboard seal module 28. In most respects, inboard seal module 26 is identical to seal module 28, both comprising conventional elements such as are known in the seal art. One apparent difference is that the elements of the seal module 26 have a wider diameter to accommodate the increased diameter of step 23. Those elements identical in both seal modules 26,28 will be identified by numerals in a different hundreds series, so that the identifying numerals differ by one hundred.

Inboard seal module 26, also referred to simply as inboard seal 26, comprises a gland plate 30 which is sealed to the housing 12 by means of an O-ring 32. The gland plate 30 may also include a bypass opening 34 to permit infusion of discharge from the seal which is collected downstream. At an inner diameter the gland plate 30 has a cavity in which the seal 26 is disposed. The inboard seal 26 comprises a mating ring 36 which is attached to the gland plate 30 by means of a pin 38. An O-ring 40 seals the mating ring 36 to the gland plate 30.

The mating ring 36 comprises a sealing face 42 and a radially extending rear face which contains an aperture 44 into which the ring accepts the pin 38. The pin 38 retains the seal ring 36 in a rotationally fixed position so it does not rotate relative to the gland plate 30. The sealing face 42 of the mating ring 36 is an annular, essentially planar, radially extending surface against which an opposing sealing face may seal, as will be explained below.

The inboard seal 26 further comprises a primary seal ring 46 disposed opposite ring 36. The primary seal ring 46 includes a sealing face 48 opposed to and generally in contact with the sealing face 42. The primary seal ring 46 is sealingly connected to a step 23 of the shaft sleeve 22 and is designed to rotate together with the shaft sleeve 22 and with the shaft 16.

The primary ring 46 is also designed and adapted to move axially relative to the shaft sleeve 22 along the step 23. A retainer 50 retains the primary ring 46 within a cavity 51 defined by an inner diameter and an outer diameter wall of the retainer 50. A plurality of springs 52 are disposed in evenly spaced circular bores 53 opening into the cavity 51 from the lateral side of the cavity 48 opposite the side which retains the primary ring 46. The springs 52 provide an axial bias to primary ring 46 through a disc 54, pushing the disc 54 against the back face of the primary ring 46 and thus causing the sealing faces 42, 48 to contact each other. An O-ring 56 seals the primary ring 46 to the step 23 of shaft sleeve 22. A snap ring 58 which fits within an appropriate annular indentation or groove 55 in the retainer 50 provides an interference fit with a protruding flanged section of the ring 46 so as to retain the ring within the retainer.

The outboard seal module 28 is of very similar construction as the inboard seal module 26. It should be noted, however, that the inner and outer diameters of the elements of the inboard seal module 26 are somewhat larger than those of the outboard seal module 28 to enable them to fit around the step 23 of the shaft sleeve 22, which has a larger diameter than step 21 supporting seal module 26. The elements of the outboard seal module 28 are supported by the smaller diameter step 21 of shaft sleeve 22. The retainer 150 and primary seal ring 146 and other elements of seal module 28 are in essence identical to those of the inboard seal module 26, and numbers separated by 100 are used to identify similar elements.

The gland plate 60 of seal module 28, however, is somewhat different from the gland plate 30. Gland plate 60 includes a flanged portion 62 which cooperates with an annular shoulder of the gland plate 30 to support the flanged portion 62 of the gland plate 60. An appropriate O-ring 62 seals between gland plates 30 and 60.

Gland plate 60 further comprises an inner diameter which defines a cavity or chamber 61 in which the outboard seal module 28 is disposed. The inner cavity 61 is in fluid communication with a vapor recovery system (not shown) through an opening 64 and, optionally, with a drain or collection tank through an opening 65 (shown in phantom). The gland plate 60 further defines a flange member 66 which includes a shoulder 68 against which the mating ring 70 is sealed by an O-ring 72.

Although the elements associated with the rotating primary rings 46,146 are essentially identical, the mating ring 70 is different from the mating ring 36. Mating ring 70 is designed to provide cooling capacity to the outboard seal module 28. The mating ring 70 includes a sealing face 74 which bears the sealing face 148 of the outboard seal primary ring 146. Mating ring 70 further includes an inner diameter 78 which is tapered relative to the shaft sleeve 22 so as to define a frusto-conically shaped space 80 between the inner diameter 78 and an outboard end of the shaft sleeve 22. The space 80 permits an air stream to flow between the mating ring inner diameter 78 and the shaft sleeve 22. To facilitate this air flow, the gland plate flanged member 66 terminates at a point significantly removed from the shaft sleeve 22. The termination of flanged member 66 is approximately even with the inner diameter 78 at the position where the two are closely adjacent to provide an opening 67 between the termination point of flange 66 and the shaft sleeve 22.

The surface 78 forming the frusto-conical space 80 is in a range of from about 5° to about 40°, and preferably is at an angle of about 15° relative to the axis of the shaft 16 and to the axis of the mating ring 70. The shape of the frusto-conical space 80 together with the opening 67 between the shoulder 66 and the shaft sleeve 22 provides access for air flow and circulation both into and out of the space 80 and the cavity 82, which is defined by the primary ring 146 and the shaft sleeve 22.

Air flow circulation is further facilitated into the space 80 through the opening 67 by means of a specially designed drive collar 90. The drive collar 90 comprises an annular ring which fits over the shaft 16 and a plurality of annular cantilever portions 92 which extend over the outboard end of the shaft sleeve 22. The annular ring and cantilevered portions 92 are also illustrated in FIGS. 4 and 5.

The cantilever portions 92 each include an axial bore 94 which extends through the cantilever portion 92 and is positioned over each axial bore 25 which extends axially through the outboard end of the shaft sleeve 22. Preferably, both the bore 94 and the bore 25 are threaded to accept a set screw (not shown) which is screwed into the two concentric bores 94, 25 into contact with the shaft 16. This set screw, together with the bores and drive collar, retain the drive collar and the shaft sleeve fixed relative to the shaft 16 so that both the shaft sleeve and the drive collar rotate with the shaft.

The drive collar 90 may optionally include a second threaded bore 96, as shown, which extends through the annular ring from an outer diameter all the way to the inner diameter adjacent the shaft 16. A second set screw (not shown) may be inserted into the optional bore 96 to ensure that the drive collar is retained on the shaft 16 without axial or rotational slippage. However, the second bore 96 and set screw (not shown) is not necessary for most applications and is utilized as a failsafe connection system for system pressures which exceed 1200 psig.

The mating ring 70 is illustrated in greater detail in FIGS. 2 and 3. A cross-sectional view of the mating ring 70 is shown in FIG. 2 clearly disclosing the angled inner diameter 78 which defines the frusto-conical shape of the space within the mating ring 70. The angled inner diameter 78 intersects an axially extending inner diameter wall 79. The inner diameter wall 79 has a sufficient diameter to provide clearance for the shaft sleeve which will rotate within the space between the inner diameter wall 79 (FIG. 1). An annularly extending groove 69 provides a retaining slot for insertion of the O-ring 72 (FIG. 1).

The drive collar is illustrated in greater detail in FIGS. 4 and 5, with FIG. 5 being a cross-sectional view of the drive collar 90 of FIG. 4 taken approximately along the lines 5—5. The line 5—5 is not straight in order to illustrate the structure of the elements providing the air pumping capability to the drive collar 90.

Cantilever projection portions 92 of the drive collar 90 are equidistantly spaced around the periphery of the drive collar. Each drive collar 90 comprises from two to twelve cantilevered portions 92. Preferably six cantilevered portions 92 are used, as shown in FIG. 4.

An annular ring comprising connecting sections 98, connects the plural cantilevered projection portions 92 and maintains the rigidity of the structure. The connecting sections 98 are contiguous with the outer diameter of the drive collar 90 and are offset from the inner diameter by an offset space comprising a substantial proportion of the distance from the inner diameter to the outer diameter. The connecting sections 98 define the offset space between them and the shaft 16 and also between the shaft sleeve 22 so that air communication between the connecting sections 98 and the shaft 16 and shaft sleeve 22 is easily provided. The cantilevered projection portions 92 are disposed over and in contact with the outboard end of shaft sleeve 22.

During shaft rotation, the drive collar 90 rotates with the shaft 16 and the shaft sleeve 22. During rotation, the axially extending side walls 100 of each of the cantilever projection portions 92 sweep air from the outboard atmosphere through the opening between the connecting sections 98 and into the opening 67 and space 80. The side walls 100 of the projection portions 92 extend generally normal to the path of rotation of the drive collar 90; that is, the walls are generally normal to a tangent taken at the drive collar side walls. However, in an alternative embodiment, the side walls may be at a small angle for perpendicular so as to provide a fan blade effect in order to more readily direct air flow inwardly from the atmosphere. This alternative construction (not shown) is most useful in an application where the shaft rotational direction is known, thus avoiding mistakes in installation. The air is continually being re-circulated throughout these areas because of the rotation of the shaft and the drive collar 90.

The circulating air removes a heat generated by the frictional forces of the contacting seal module 28 so that the seal and the seal area are connectively cooled. The addition of an inventive drive collar 90 together with the angled surface 78 of the mating ring 70 provides a significant cooling function to the device which is not available with conventional contacting seals. Testing of the inventive device has indicated a reduction in operating temperature of the seal at or around the seal faces of at least 15° to 20° F., a significant reduction.

Reduction of temperature in the seal faces and the seal area is desirable because of the introduction of heat stress and thermal taper considerations to the primary and mating rings which result from localized areas of heat generation. Elimination or reduction of the excessive heat generated by the seal faces has been found desirable in maintaining the parallelity of the seal faces to each other and in the effectiveness of the seal. Very flat sealing faces 74,148 which are maintained in essentially the same plane because of reduced thermal taper are desirable to reduce the amount of fluid leakage from the seal.

Modifications to the seal structure may be used to further reduce the heat generation of the seal face friction when the shaft is rotating. For example, materials can be used which provide a decrease in the amount of frictional heat created by the contacting seal faces 74 and 148. It has been found that the primary ring made of graphite and a mating ring manufactured from silicon carbide will reduce the heat generated at the sealing faces. The graphite ring will wear away some of the higher points (asperities) of its surface onto the lower points between the asparities of the carbide ring so that relatively smoother sealing faces develop for each ring. Also, a lighter load on the spring 152 will maintain the heat generation to a minimum.

The inventive embodiment described herein relates to the preferred dual seal arrangement. However, the invention is equally applicable in a single seal module environment where cooling of the seal interface is required. Other modifications may become apparent from an understanding of the inventive concept to a person of ordinary skill in the art. Accordingly, this invention is not limited by the illustrated embodiment shown and described herein, but is limited only by the following claims.

What is claimed is:

1. A mechanical end face seal for providing fluid tight sealing between a housing containing a fluid and a shaft extending through an aperture in the housing, the shaft rotating relative to the housing, the seal comprising:

a) a first ring having a generally radially extending sealing face;

b) a second ring having a generally radially extending sealing face shaped and dimensioned to be in opposite mating relationship to the sealing face of said first ring, the portions of said second ring sealing face which sealingly engage said first ring sealing face defining a seal interface, one of the rings being disposed coaxially with said shaft and being nonrotatably connected with and sealed against the housing, and the other of the rings being sealed to and connected coaxially with the shaft to rotate therewith, said first ring being disposed adjacent the ambient environment downstream of said seal, one of said rings being movable axially relative to the shaft;

c) a biasing means adapted to urge the axially movable ring toward the other ring to bring the sealing faces close to each other to provide a rotatable sealing engagement relative to one another, said first seal ring having a frusto-conical inner diameter surface, the first seal ring inner diameter being narrower at the portion of the first seal ring adjacent the seal interface and becoming wider at the portion of the first seal ring adjacent the radially extending wall opposite said sealing face, the first seal ring inner diameter together with said shaft defining a substantially frusto-conical, annular space therebetween; and d) the seal further including a fluid circulation means attached to and rotating with said shaft, the fluid circulation means being disposed downstream of said seal and being spaced from and in close proximity to said first seal ring radially extending wall opposite the sealing face of said one ring, said fluid circulation means being shaped and dimensioned to pump ambient fluid during shaft rotation from the ambient environment outside said housing into the frusto-conical space defined by the first ring inner diameter and into direct contact with the frusto-conical inner diameter surface of said first seal ring, and to circulate said ambient fluid through said frusto-conical space, whereby the ambient fluid directly cools at least said first seal ring.

2. The seal according to claim 1 further comprising a shaft sleeve annularly disposed about said shaft and between said seal rings and said shaft, said fluid circulation means further comprising a drive collar for attaching said shaft sleeve to said shaft, said drive collar being shaped, dimensioned and adapted to circulate the ambient fluid through the annular frusto-conical space.

3. The seal according to claim 1 wherein said fluid circulation means further comprises a drive collar having projection portions disposed axially about the shaft and axially removed from the housing, each said projection portion including at least one substantially radial wall which extends generally normal to the tangent of rotation of said drive collar when said shaft is rotating.

4. The seal according to claim 1 wherein said primary ring comprises a material taken from the group of carbon graphite materials and said mating ring comprises a material taken from the group of tungsten carbide and silicon carbide.

5. The seal according to claim 1 wherein said first ring is disposed coaxially with said shaft and is non-rotatably connected with and sealed against said housing and said second ring is sealed to and connected axially with said shaft to rotate therewith.

6. The seal according to claim 5 wherein said second ring is movable axially relative to said shaft and is biased by said biasing means toward the first ring.

7. The seal according to claim 1 wherein said second ring is movable axially relative to said shaft and is biased by said biasing means toward the first ring.

8. A tandem mechanical end face seal system for providing fluid tight sealing between a housing containing a fluid and a shaft extending through an aperture in the housing and rotating relative thereto, the seal system comprising:

a) an upstream seal having a primary ring with a generally radially extending sealing face, a mating ring with a generally radially extending sealing face shaped and dimensioned to be in opposite mating relationship to the sealing face of said upstream seal primary ring, the portions of each said sealing face which sealingly engage the other sealing face defining an upstream seal interface, one of the rings being sealed to and nonrotatably connected with the housing, coaxially with said shaft, and the other of the rings being sealed to and connected coaxially with the shaft to rotate therewith, one of the rings being movable axially relative to the shaft, the upstream seal further including a biasing means adapted to urge the axially movable ring toward the other ring to bring the sealing faces close to each other and to have a rotatable sealing engagement relative to one another;

b) a downstream seal having a primary ring with a generally radially extending sealing face, a mating ring with a generally radially extending sealing face shaped and dimensioned to be in opposite mating relationship to the sealing face of said downstream seal primary ring, the portions of each said sealing face which sealingly engage the other of said rings defining a downstream seal interface, one of the rings being sealed to and nonrotatably connected with the housing, coaxially with said shaft, and the other of the rings being sealed to and connected coaxially with the shaft to rotate therewith, one of the rings being movable axially relative to the shaft, the downstream seal further including a biasing means adapted to urge the axially movable ring toward the other ring to bring the seal faces close to each other and to have a rotatable sealing engagement relative to one another, one of said rings of said downstream seal being disposed adjacent the ambient environment downstream of said downstream seal, said one seal ring having a frusto-conical inner diameter surface, the one seal ring inner diameter being narrower at the portion of the seal ring adjacent the sealing face and becoming wider at the portion of the seal ring adjacent the ambient environment, thereby defining a substantially frusto-conical space between the one seal ring inner diameter and the shaft;

c) an annular buffer fluid chamber disposed between said upstream and downstream seals; and d) a drive collar attached to said shaft downstream of said downstream seal adjacent said wider inner diameter end of said one ring, said drive collar rotating with said shaft and being shaped and dimensioned to pump fluid during shaft rotation from the ambient environment outside said housing into the frusto-conical space defined by the one ring inner diameter and into direct contact with the frusto-conical inner diameter surface of said one seal ring, whereby the fluid from the ambient environment directly cools at least said one ring.

9. The seal according to claim 8 wherein said drive collar has projection portions disposed axially about the shaft and axially removed from the housing, each said projection portion including at least one substantially radial wall which extends generally normal to the tangent of rotation of said drive collar when said shaft is rotating.

10. The seal according to claim 8 further comprising a shaft sleeve disposed between said seals and said shaft, said shaft seal being sealed against said shaft, and said fluid circulation means further comprising a drive collar for attaching said shaft sleeve to said shaft, said drive collar being shaped, dimensioned and adapted to circulate the ambient fluid through the annular frusto-conical space.

11. The seal according to claim 10 wherein said drive collar has projection portions disposed about the shaft and axially removed from the housing, each said projection portion including at least one substantially radial wall which extends generally normal to the tangent of rotation of said drive collar when said shaft is rotating.

12. The seal according to claim 8 wherein at least one of said primary rings comprises a material taken from the group of carbon graphite materials and at least one of said mating rings comprises a material taken from the group of tungsten carbide and silicon carbide.

13. The seal according to claim 8 further comprising an annular buffer chamber defined by said upstream and downstream seals.

14. The seal according to claim 12 wherein the fluid in said buffer chamber comprises the fluid to be sealed which has passed across the seal faces of the upstream seal.

15. The seal according to claim 13 further comprising a vent passage in fluid communication with said buffer chamber for removing or disposing of fluid to be sealed from said buffer chamber.

* * * * *